United States Patent
Yang et al.

(10) Patent No.: US 8,725,925 B2
(45) Date of Patent: May 13, 2014

(54) INTERFACE ADAPTER BETWEEN PCI EXPRESS INTERFACE AND HDMI INTERFACE AND ADAPTING METHOD THEREOF

(75) Inventors: Jhih-Ren Yang, Taichung (TW); Ju-Chi Chung, Nantou County (TW)

(73) Assignees: Universal Scientific Industrial (Shanghai) Co., Ltd., Shanghai (CN); Universal Global Scientific Industrial Co., Ltd., Nantou County (TW)

( * ) Notice: Subject to any disclaimer, the term of this patent is extended or adjusted under 35 U.S.C. 154(b) by 255 days.

(21) Appl. No.: 13/316,614

(22) Filed: Dec. 12, 2011

(65) Prior Publication Data

US 2013/0151748 A1 Jun. 13, 2013

(51) Int. Cl.
- *G06F 13/36* (2006.01)
- *G06F 13/38* (2006.01)
- *G06F 13/40* (2006.01)

(52) U.S. Cl.
CPC .......... *G06F 13/4027* (2013.01); *G06F 13/385* (2013.01)
USPC ............................................. 710/315; 710/62

(58) Field of Classification Search
USPC .......... 710/62–64, 72–74, 305–315, 104–110
See application file for complete search history.

(56) References Cited

U.S. PATENT DOCUMENTS

| | | | | |
|---|---|---|---|---|
| 7,383,365 B2 * | 6/2008 | Sauber | ............................ | 710/38 |
| 7,502,470 B2 * | 3/2009 | Hanko et al. | .................. | 380/200 |
| 7,768,306 B2 * | 8/2010 | Chiu | ............................... | 326/68 |
| 8,195,852 B2 * | 6/2012 | Tantos et al. | ..................... | 710/72 |
| 8,203,325 B2 * | 6/2012 | Miller et al. | .................... | 324/66 |
| 8,369,101 B2 * | 2/2013 | Chuang | ......................... | 361/803 |

* cited by examiner

*Primary Examiner* — Raymond Phan
(74) *Attorney, Agent, or Firm* — Li & Cai Intellectual Property (USA) Office

(57) ABSTRACT

A structure for transmitting signals of PCI express and a method thereof provides a converting device and a high-definition multimedia interface (HDMI) cable. The converting device has a plug connector to into a PCI express slot, along with a HDMI connector. The signal converting circuit connects the signal pins of the PCI express slot to the signal pins of HDMI connector. One end of the HDMI cable is connected with the HDMI connector of the converting device. The present invention can extends the signal distance of the PCI express to exactly perform the signal test.

4 Claims, 5 Drawing Sheets

| | | | | | | 14 |
|---|---|---|---|---|---|---|
| | | 141 | | 142 | | 143 |

| HDMI signal pin | first pair | | second pair | | third pair | |
|---|---|---|---|---|---|---|
| | T_D2+ | T_D2- | T_D1+ | T_D1- | T_D0+ | T_D0- |
| signal connection | ⇕ | | ⇕ | | ⇕ | |
| PCI Express signal pin | first pair | | second pair | | third pair | |
| | PERp0 | PERn0 | PETp0 | PETn0 | REFCLK+ | REFCLK+ |

FIG. 2

INTERFACE ADAPTER BETWEEN PCI EXPRESS INTERFACE AND HDMI INTERFACE AND ADAPTING METHOD THEREOF

BACKGROUND OF THE INVENTION

1. Field of the Invention

The present invention relates to a structure for transmitting signals of PCI express (Peripheral Component Interconnect Express) and a method thereof; in particular, to a structure for transmitting signals of PCI express for testing the circuit with the PCI express and a method thereof

2. Description of Related Art

As the ability of processing data of the elements in computer systems has been improved, PCI express (Peripheral Component Interconnect Express) is developed for transmitting high speed data. PCI express is a new generation PCI that is compatible to the old PCI and the data transmission rate is highly increased.

In order to assure the mother board with the PCI express be operated normally, signal quality test is performed. A bus or an integrated circuit adaptor is connected with the PCI express on the mother board to input test signal and receive the return signal. The bus usually also has a function for extending signal.

During test, a lot of factors, such as signal interference, signal attenuation, sort of test fixtures, etc, must be considered to prevent the test from being wrong. According to experience, the different test fixture, especially for signal transmission bus will generate different eye diagram, will affect the test result. When different test tools are used to test the same product, the test results also maybe different. Therefore, the bus for transmitting signals is a key factor for testing.

Furthermore, PCI express is used for transmitting high speed signal. The first generation PCI express had a bandwidth of 2.5 GB per second for one data channel in one direction. The signal will be interfered or attenuated so that the testing process is unstable when the bus becomes longer. Therefore, the cost of the bus for PCI express is expensive.

How to provide a cheap and stable signal transmission and method for PCI express test is a major concern for the manufacturer.

To address the above issues, the inventor proposed a new structure and method for transmitting PCI express signals.

SUMMARY OF THE INVENTION

The object of the present invention is to provide a structure for transmitting signals of PCI express that can transmit the signals of PCI express well and its cost is low.

Another object of the present invention is to provide a method for transmitting signals of PCI express that can transmit the signals of PCI express well and its cost is low.

In order to achieve the aforementioned objects, according to an embodiment of the present invention, a structure for transmitting signals of PCI express is provided. The structure for transmitting signals of PCI express includes a converting device and a high-definition multimedia interface (HDMI) cable. The converting device has a plug connector for the PCI express slot, a HDMI connector, and a signal converting circuit for connecting the signal pins of the PCI express slot to the signal pins of HDMI connector. One end of the HDMI cable has a HDMI connector for connecting the HDMI connector of the converting device.

The present invention has the following advantages. The present invention can transmit the signal of PCI express properly. Moreover, the present inventor utilizes the HDMI cable to reduce the total cost.

In order to further the understanding regarding the present invention, the following embodiments are provided along with illustrations to facilitate the disclosure of the present invention.

BRIEF DESCRIPTION OF THE DRAWINGS

FIG. 2 shows a table of the signal converting circuit according to an embodiment of the present invention;

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

Figure 1:
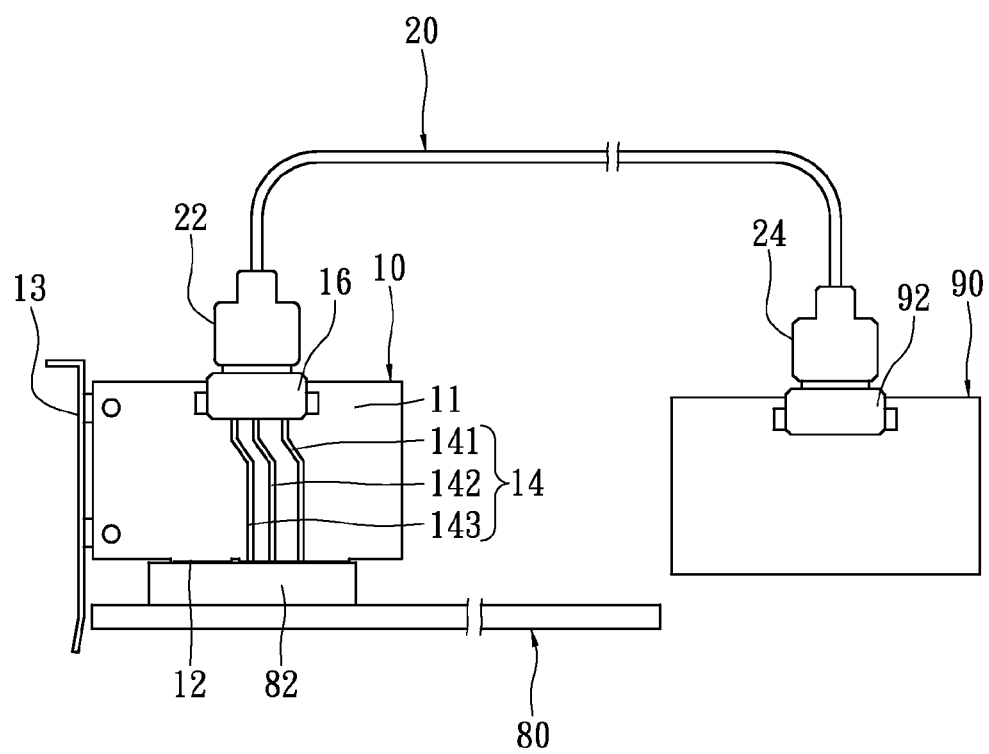
FIG. 1 shows a schematic view of the structure for transmitting signals of PCI express according to an embodiment of the present invention.

Reference is made to FIG. 1, which shows a schematic view of the structure for transmitting signals of PCI express according to an embodiment of the present invention. The structure for transmitting signals of PCI express includes at least one converting device 10, and a HDMI cable 20.

The converting device 10 has a plug connector 12 to plug into the PCI express slot 82 of a circuit board 80, a HDMI connector 16, and a signal converting circuit 14. By using the signal converting circuit 14, the signal pins of the PCI express slot 82 is connected to the signal pins of HDMI connector 16.

In this embodiment, the converting device 10 is an interface card. The converting device 10 has a shape of an interface card, and has a circuit board 11 and an external connecting board body 13. The external connecting board body 13 is used for anchoring the converting device 10 to the tested computer housing (not shown in the figure). The signal converting circuit 14 can be formed on the circuit board 11.

Two ends of the HDMI cable 20 respectively have a HDMI connector 22, 24 for connecting the HDMI connector 16 of the converting device 10. Because the HDMI cable 20 is a well-established product and can be easily obtained, the cost of the HDMI cable 20 is lower than the cost of the PCI express cable. Thereby, the present invention helps in reducing the overall cost.

HDMI is a connection interface for transmitting high speed and high quality digital data and meets the requirements of transmitting audio-video data and reducing the interface dimension. The HDMI is developed from digital visual interface (DVI). Comparing to the DVI, the connector of HDMI is smaller, and requires only a single cable to provide the audio multi-channel function.

According to the specification of the HDMI cable, the signal impedance is $100\Omega \pm 10\Omega$, which meets the specification of PCI express. Therefore, the present invention utilizes the above characteristic to perform the interface convert. The signal can be extended and the signal quality is assured.

The HDMI connector 24 of another end of the HDMI cable 20 can be connected with the testing device 90 with a HDMI connector 92 to send and receive signals. The goal of transmitting and extending signal of PCI express is achieved.

The HDMI connector 16 of the converting device 10 is not limited to a male connector or a female connector. The HDMI cable typically has two type A male connectors. Therefore, the HDMI connector 16 of the converting device 10 is preferred to be a female connector. Moreover, the pin number of the HDMI can be 19 (Type A), or 29 (Type B for supporting higher resolution. The type of the HDMI of the present invention is not limited. The HDMI cable with two type A male connectors is sufficient.

Reference is made to FIG. 2, which shows a table of the signal converting circuit according to an embodiment of the present invention. The number of the pins of PCI express is different from the number of the pins of the HDMI. The following illustrates how to use the signal converting circuit 14 to convert and connect the pins of the PCI express slot 82 with the pins of the HDMI connector 16.

Although the PCI express has been developed in different versions, the pins are divided into the following groups, including power group, PCI express group, universal serial bus (USB) group, auxiliary signals group, communications specific signals group, and user identify module (UIM) signals group.

The type A pins of HDMI includes TMDS data group 0~5 (TMDS Data0~Data5, each has a positive pin, a negative pin, and a sheltering pin), TMDS clock group (TMDS clock, including a positive pin, a negative pin, and a sheltering pin), a pair of reserved pin, power pin, hot plug detection pin, and grounding pin etc. TMDS is an abbreviation of transition minimized differential signaling, and is an electronic protocol. It can encode the pixel data and transmit the encoded data by serial bus. TDMS Data0 can be abbreviated as T_D0.

In this embodiment, the pins of PCI express group are connected to the pins of TMDS data group 0~2 of the HDMI, as shown in FIG. 2. Specifically, the PCI express has three pairs of signal pins. The first pair is zero channel receiving pins (pair 1, PERp0 and PERn0). The second pair is zero channel transmitting pins (pair 2, PETp0 and PETn0). The third pair is reference clock pins (pair 3, REFCLK+ and REFCLK−). The PE of PER and PET is an abbreviation of PCI express. R is Receiver. T is Transmitter. p is positive. n is negative. 0 is Lane0. In this embodiment, the first three pairs of the data group of the pins of HDMI are used, but the shield pin is not used, including the third pair (T_D0+, and T_D0−), the second pair (T_D1+, and T_D1−) and the first pair (T_D2+, and T_D2−). Thereby, the two kinds of interfaces are converted. However, the other pairs of pins of the HDMI also can be used.

Reference is made to Fig. 2. The signal converting circuit 14 can be divided into three pairs of converting circuits 141, 142, 143. The third pair of converting circuit 143 connects the reference clock pin group of PCI express slot 82 to the zeroth data pin group (T_D0+ and T_D0−) of the HDMI connector 16. The second pair of converting circuit 142 connects the zero channel transmitting pin group of PCI express slot 82 to the first data pin group (T_D1+ and T_D1−) of the HDMI connector 16. The first pair of converting circuit 141 connects the zero channel receiving pin group of PCI express slot 82 to the second data pin group (T_D2+ and T_D2−) of the HDMI connector 16.

Figure 3:
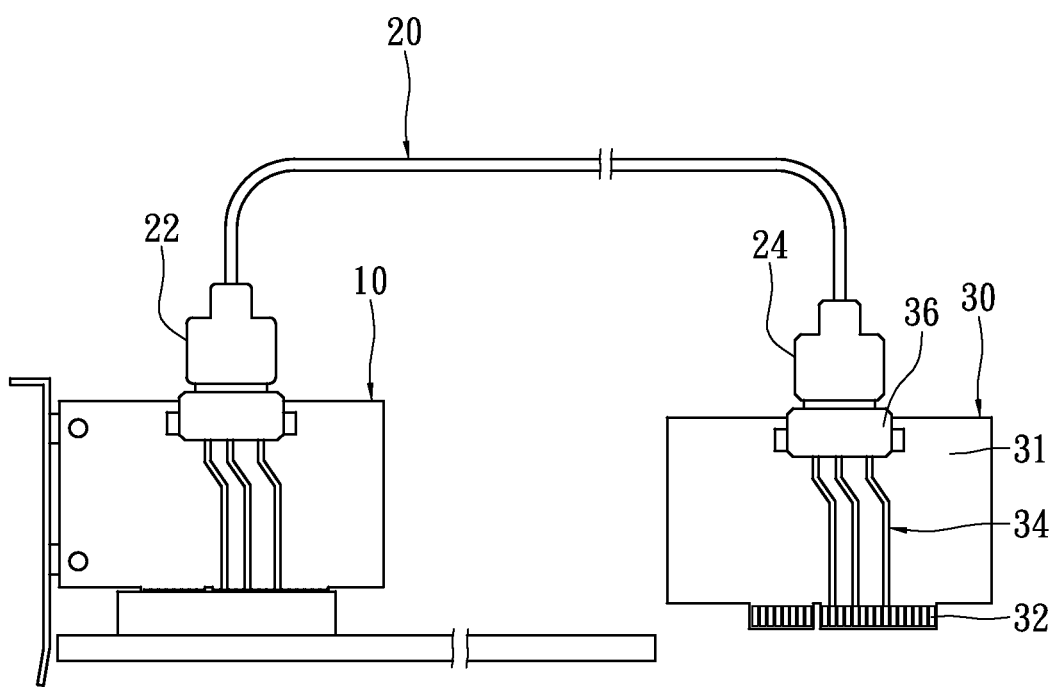
FIG. 3 shows another schematic view of the structure for transmitting signals of PCI express according to the second embodiment of the present invention.

Reference is made to FIG. 3, which shows another schematic view of the structure for transmitting signals of PCI express according to the second embodiment of the present invention. In this embodiment, the structure for transmitting signals of PCI express further includes another converting device 30. The converting device 30 includes a circuit board 31, a plug connector 32 to plug into a PCI express slot (not shown in the figure), a signal converting circuit 34, and a HDMI connector 36. The signal converting circuit 34 converts and connects the signal pins of HDMI connector 36 to the pins of the plug connector 32 (the signal pins of the PCI express slot).

The eye diagram is an important factor to judge the testing result for the PCI express interface. The measurement result of the eye diagram is observed to assure the stability of signal transmission. The analysis would indicate any problems with signal quality, transmission stability, or other product specification issues.

The testing process usually looks for any abnormal pattern in the eye diagram from the scope generator. On the scope generator, an eye-shaped pattern is shown. The eye diagram that meets the conditions usually is rhombic and does not contact the surrounding waveforms, including unit intervals (ps) in X coordinate and differential signal (mV) in Y coordinate. When the eye diagram contacts any one of the surrounding waveforms, the testing result is judged as failure. For compliance eye test, the differential amplitude of the input signal must be smaller than 120 mV, and the time must approach 0.4 UI.

Figure 4:
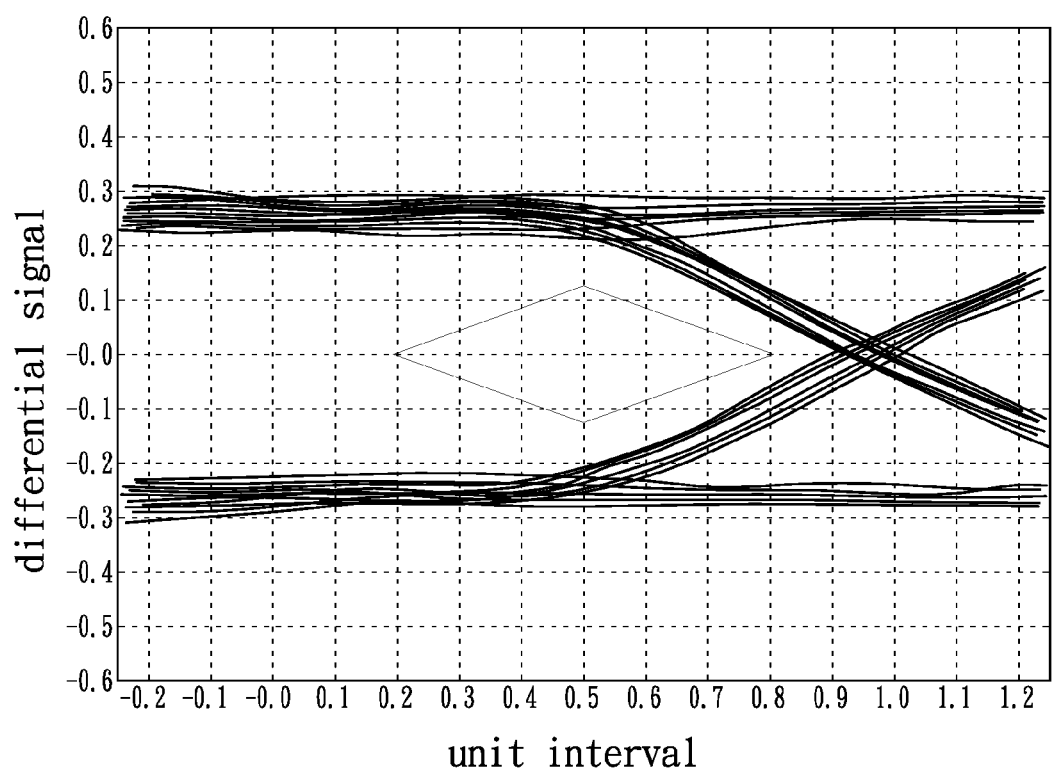
FIG. 4 shows an eye diagram of the worst non transition signal eye when the measuring test is performed of the present invention.
Figure 5:
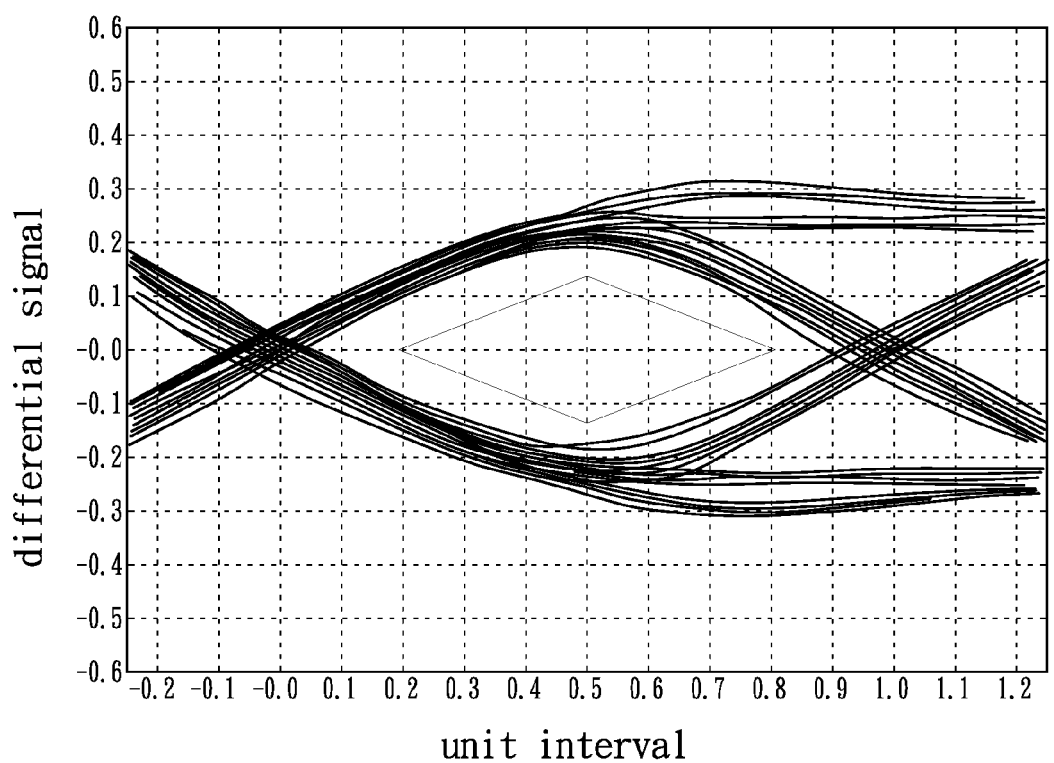
FIG. 5 shows an eye diagram of the worst transition signal eye when the measuring test is performed of the present invention.

Reference is made to FIGS. 4 and 5, which show the worst non transition signal eye and the worst transition signal eye diagram of the present invention. The present invention utilizes the HDMI cable to transmit the signals of the PCI express. Test result shows the transmission distance can be extended to at least 1.5 m, and the invention passed both kinds of eye diagram test of the PCI express. As shown in FIG. 4, the present invention passes the eye diagram of the worst non transition signal eye. It allows the examiners to observe the de-emphasized bits (the eye diagram of the non transition data bit). As shown in FIG. 5, the present invention passes the eye diagram of the worst transition signal eye. It allows the examiners to observe the eye diagram of the bits following a transition in the differential signal.

The structure for transmitting signals of PCI express and a method thereof of the present invention has the following characteristics.

1. The present invention utilizes the HDMI cable to transmit the signals of PCI express well, and its minimum transmission distance is 1.5 m.

2. By utilizing the structure for transmitting signals of PCI express, the HDMI cable can directly used to reduce the overall cost.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. An interface adapter between PCI express interface and HDMI interface, comprising:
a converting device having a plug connector to plug into a PCI express slot, a HDMI connector, and a signal converting circuit for connecting the signal pins of the PCI express slot to the signal pins of HDMI connector;

wherein a reference clock pin group of the PCI express slot is connected with a zeroth data pin group of the HDMI connector;

wherein a zero channel transmitting pin group of the PCI express slot is connected with a first data pin group of the HDMI connector;

wherein a zero channel receiving pin group of the PCI express slot is connected with a second data pin group of the HDMI connector; and a high-definition multimedia interface cable, wherein one end of the HDMI cable has a HDMI connector for connecting the HDMI connector of the converting device.

2. The interface adapter between PCI express interface and HDMI interface according to claim 1, wherein the converting device is formed on an interface card.

3. The interface adapter between PCI express interface and HDMI interface according to claim 1, further comprising another converting device, wherein another end of the HDMI cable includes a HDMI connector.

4. An adapting method between PCI express interface and HDMI interface, comprising:

providing a converting device, wherein the converting device has a plug connector to plug into a PCI express slot and a HDMI connector;

providing a signal converting circuit for connecting the signal pins of the PCI express slot to the signal pins of HDMI connector;

wherein a reference clock pin group of the PCI express slot is connected to a zeroth data pin group of the HDMI connector;

wherein a zero channel transmitting pin group of the PCI express slot is connected to a first data pin group of the HDMI connector;

wherein a zero channel receiving pin group of the PCI express slot is connected to a second data pin group of the HDMI connector; and providing a HDMI cable, wherein two ends of the HDMI cable respectively have a connector for connecting the HDMI connector of the converting device.

* * * * *